(12) United States Patent
Nishimura et al.

(10) Patent No.: US 11,755,039 B2
(45) Date of Patent: Sep. 12, 2023

(54) SERVER DEVICE, SYSTEM, AND OPERATION METHOD FOR SYSTEM

(71) Applicant: TOYOTA JIDOSHA KABUSHIKI KAISHA, Toyota (JP)

(72) Inventors: Kazuya Nishimura, Anjo (JP); Shin Sakurada, Toyota (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 17/669,717

(22) Filed: Feb. 11, 2022

(65) Prior Publication Data
US 2022/0326721 A1 Oct. 13, 2022

(30) Foreign Application Priority Data
Apr. 13, 2021 (JP) ................................. 2021-067935

(51) Int. Cl.
| | | |
|---|---|---|
| *B64C 39/02* | (2023.01) | |
| *B64U 10/13* | (2023.01) | |
| *B64U 101/60* | (2023.01) | |
| *G05D 1/10* | (2006.01) | |

(52) U.S. Cl.
CPC ........... *G05D 1/104* (2013.01); *B64C 39/024* (2013.01); *B64U 10/13* (2023.01); *B64U 2101/60* (2023.01)

(58) Field of Classification Search
CPC .. G05D 1/104; B64C 39/024; B64U 2101/60; B64U 2201/102; B64U 10/13; G08G 5/0013; G08G 5/0069; G08G 5/0043
See application file for complete search history.

(56) References Cited

FOREIGN PATENT DOCUMENTS

JP          2018-203056 A          12/2018

*Primary Examiner* — Anne Marie Antonucci
*Assistant Examiner* — Jared C Bean
(74) *Attorney, Agent, or Firm* — Oliff PLC

(57) ABSTRACT

A server device transmits an instruction for causing a plurality of flying bodies to perform flight operation to the flying bodies. The flight operation includes a step in which a first flying body urges a penetrating tool toward an object placed in a predetermined space and flies out of the predetermined space while holding a first part and a second part of a string member attached to the penetrating tool, the first part having penetrated the object and the second part not having penetrated the object, a step in which a second flying body receives either the first or second part from the first flying body, and a step in which the first and second flying bodies transport the object while towing the object with the string member as the first and second flying bodies fly while respectively holding one or the other of the first and second parts.

20 Claims, 13 Drawing Sheets

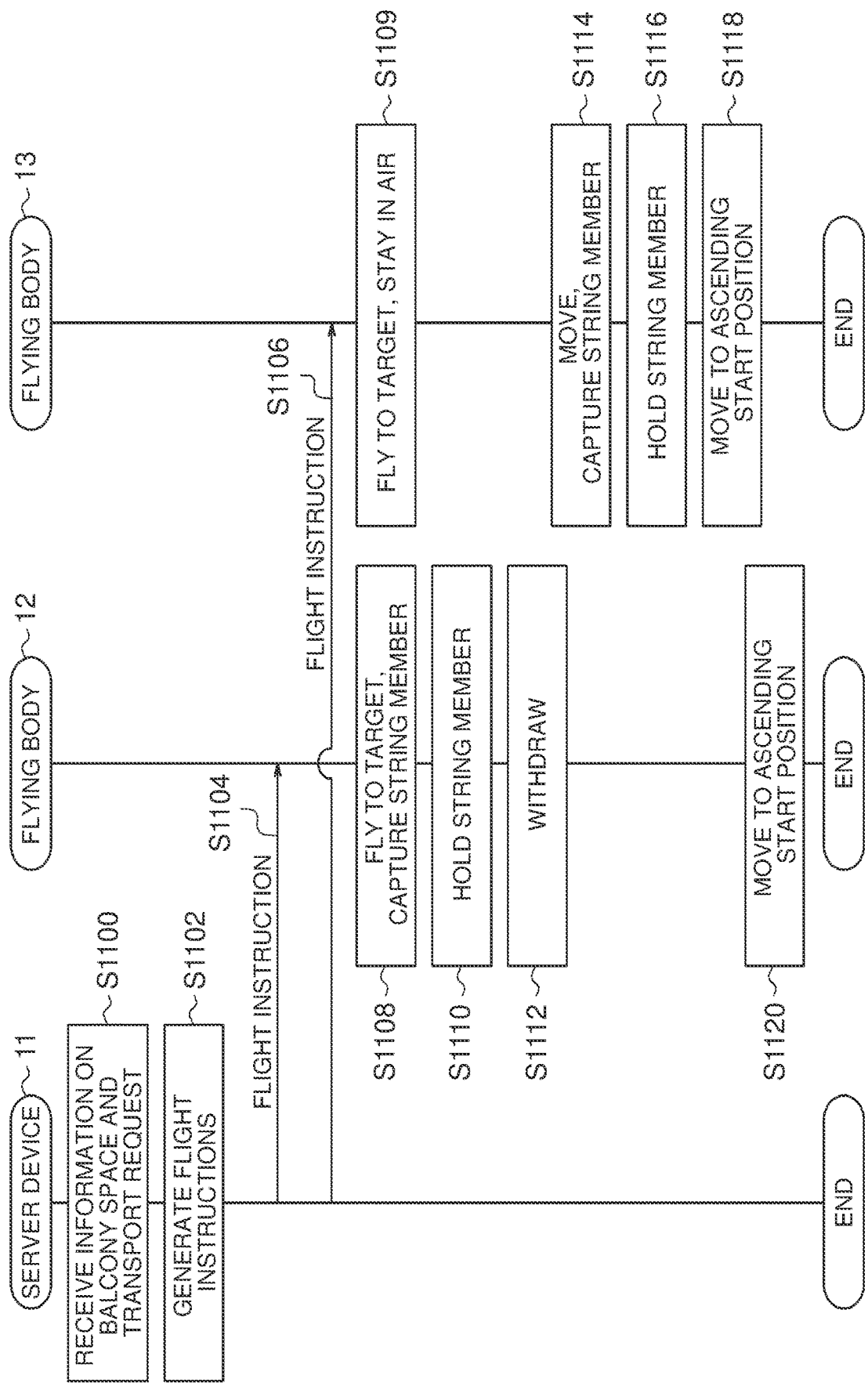

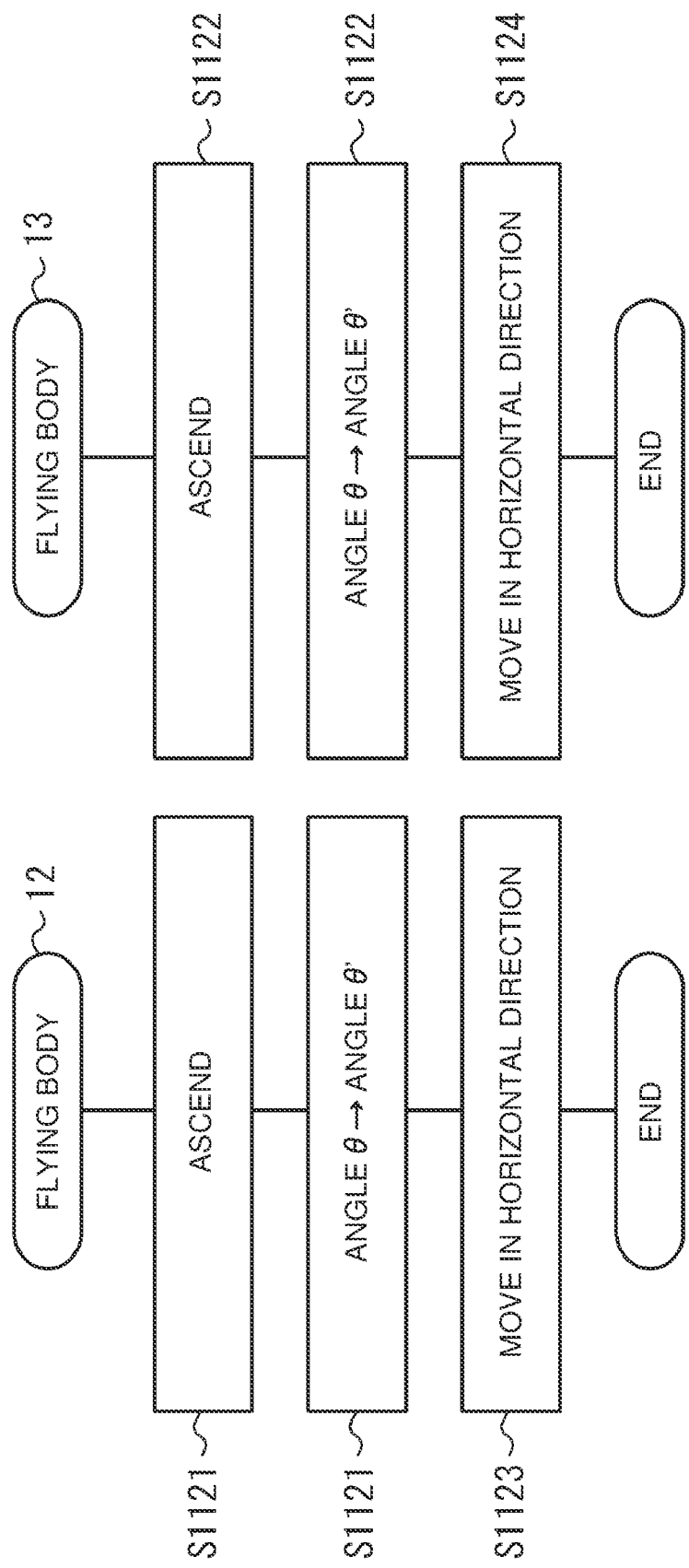

SERVER DEVICE, SYSTEM, AND OPERATION METHOD FOR SYSTEM

CROSS-REFERENCE TO RELATED APPLICATION

This application claims priority to Japanese Patent Application No. 2021-067935 filed on Apr. 13, 2021, incorporated herein by reference in its entirety.

BACKGROUND

1. Technical Field

The present disclosure relates to a server device, a system, and an operation method for the system.

2. Description of Related Art

In recent years, methods of transporting various objects with an unmanned flying body such as a drone have been proposed. In connection with such a technique, Japanese Unexamined Patent Application Publication No. 2018-203056 (JP 2018-203056 A) discloses an accommodation device for storing objects transported by a drone.

SUMMARY

When the flying body transports an object, the flight operation may be subject to the constraint arising from the size of the space in which the flying body can fly, so there is room for improving the flight operation of the flying body.

In the following, a server device and the like will be disclosed that enable the efficiency of flight operation by a flying body to be improved even under the constraint arising from the flight space.

A server device in the present disclosure includes: a communication unit; and a control unit that transmits an instruction for causing a plurality of flying bodies to perform flight operation to the flying bodies via the communication unit. The flight operation includes a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members, and a second step in which the first and second flying bodies move horizontally so as to transport the object suspended with the first and second string members to the outside of the handrail. The predetermined angle is such an angle that the second string member does not interfere with the handrail during the first step.

A transport system in the present disclosure includes: a plurality of flying bodies; and a server device that transmits an instruction for causing the flying bodies to perform flight operation to the flying bodies. The flight operation includes a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members, and a second step in which the first and second flying bodies move horizontally so as to transport the object suspended with the first and second string members to the outside of the handrail. The predetermined angle is such an angle that the second string member does not interfere with the handrail during the first step.

In the present disclosure, an operation method for a system including a plurality of flying bodies and a server device that transmits an instruction for causing the flying bodies to perform flight operation to the flying bodies includes: a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members; and a second step in which the first and second flying bodies move horizontally so as to transport the object suspended with the first and second string members to the outside of the handrail. The predetermined angle is such an angle that the second string member does not interfere with the handrail during the first step.

According to the present disclosure, it is possible to improve the efficiency of flight operation by flying bodies even under the constraint arising from the flight space.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 9A is a sequence diagram showing an operation example of the transport system; and FIG. 9B is a sequence diagram showing an operation example of the transport system.

DETAILED DESCRIPTION OF EMBODIMENTS

Hereinafter, an embodiment will be described.

Figure 1:
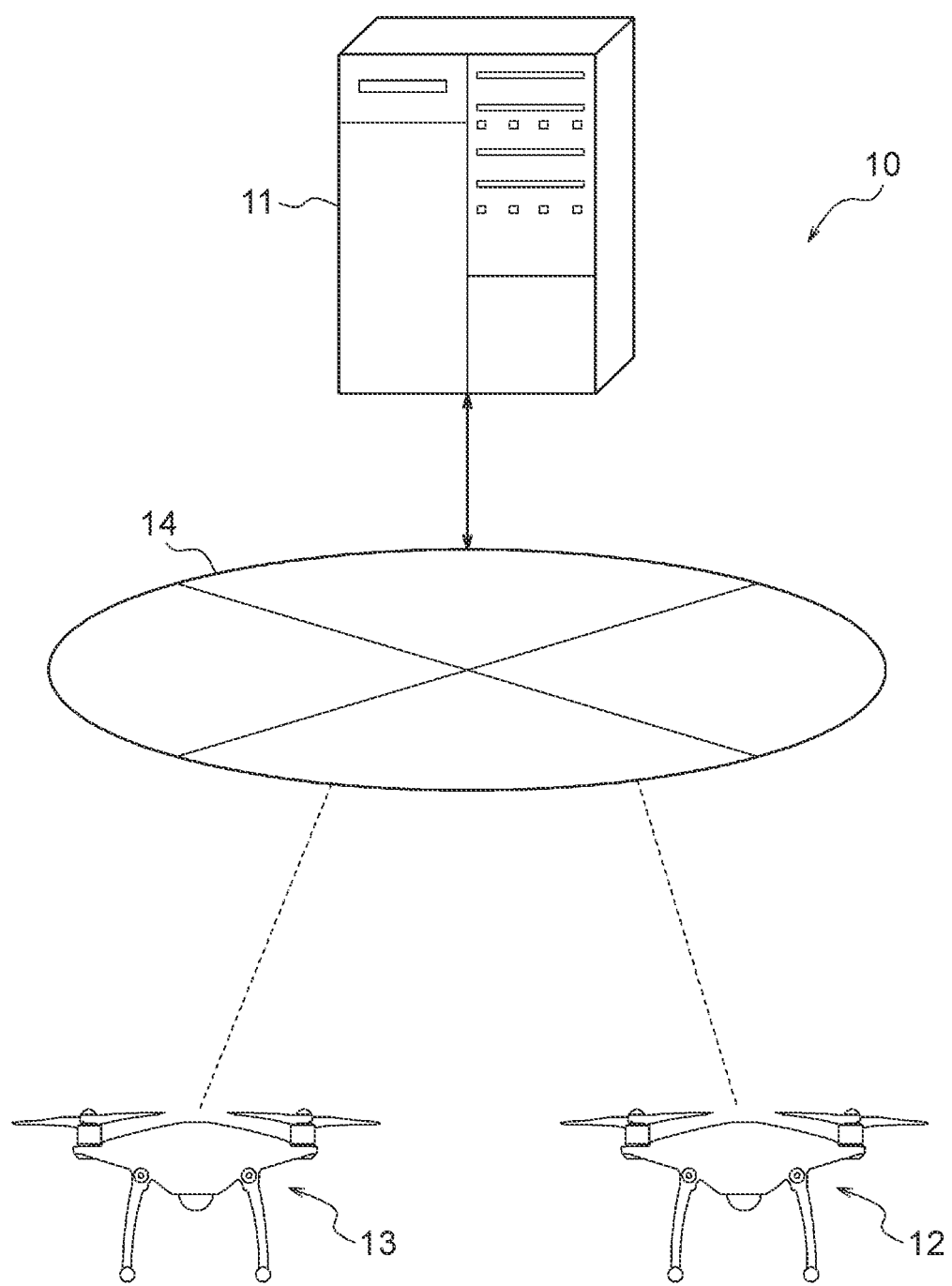
FIG. 1 is a diagram showing a configuration example of a transport system.

FIG. 1 is a diagram showing a configuration example of a transport system according to the present embodiment. As shown in FIG. 1, a transport system 10 includes a server device 11 and flying bodies 12 and 13 that transport objects under the control of the server device 11. The server device 11 and the flying bodies 12 and 13 are connected so as to be able to communicate with each other via a network 14. The server device 11 is, for example, a server belonging to a cloud computing system or other computing systems and implemented with various functions. The flying bodies 12 and 13 are drones that obtains power from electric power or the like to rotate a plurality of rotor blades so as to generate lift and thrust, thereby flying in the air. In the present embodiment, the flying bodies 12 and 13 fly by autonomous control in response to an instruction from the server device 11, but may fly by remote control as appropriate. The flying bodies 12 and 13 each have a mechanism for transporting an object, as will be described in detail later. The network 14 is the Internet, for example, but includes an ad hoc network, a local area network (LAN), a metropolitan area network (MAN), another network, or a combination thereof.

Figure 2A:
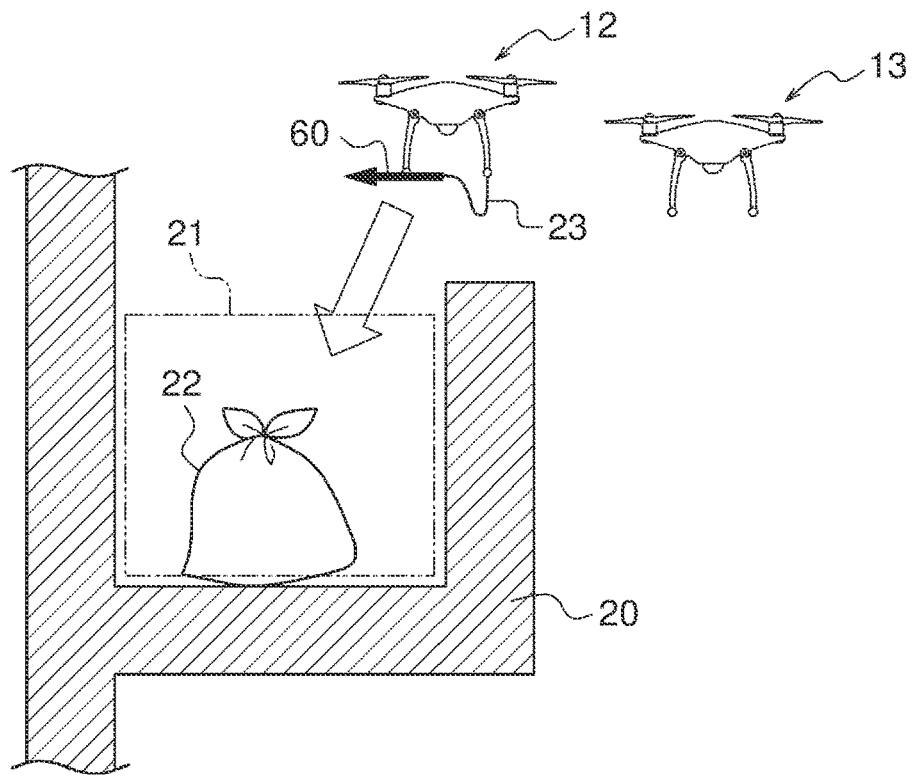
FIG. 2A is a diagram illustrating operation of the transport system.
Figure 2B:
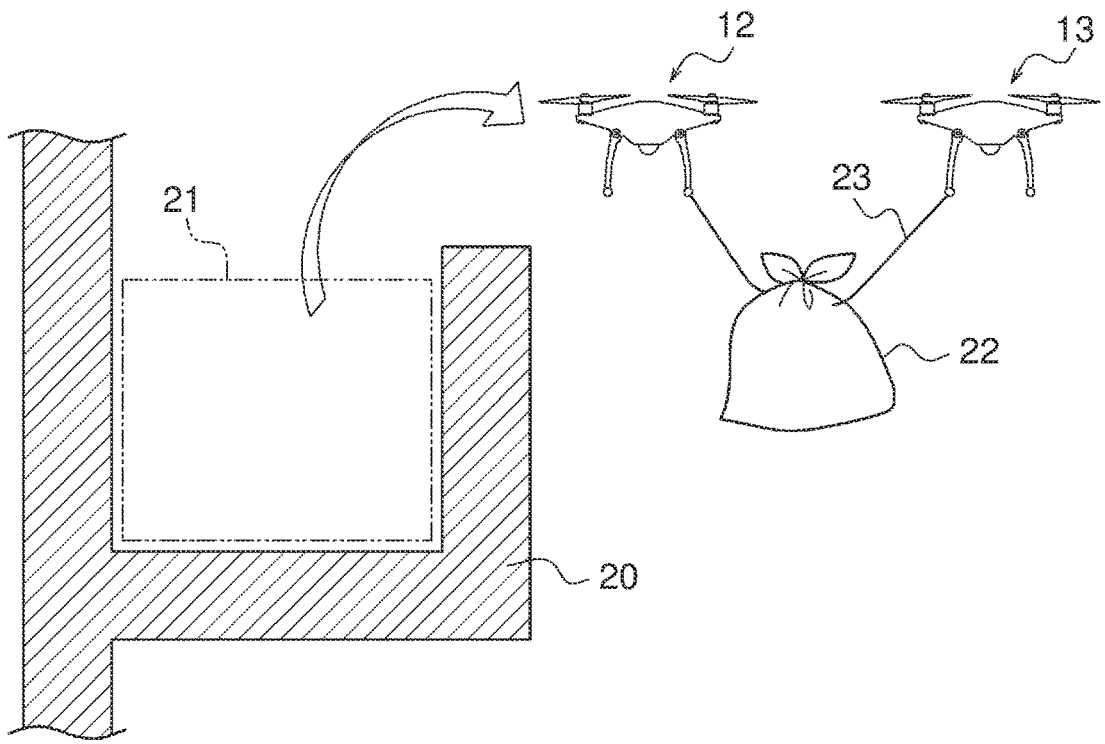
FIG. 2B is a diagram illustrating the operation of the transport system.

FIGS. 2A and 2B are diagrams showing an outline of operation of transporting an object by the flying bodies 12 and 13 in the present embodiment. The flying bodies 12 and 13 transport the object placed in a predetermined space to the outside of the predetermined space. In the present embodiment, the predetermined space is a space surrounded by a floor surface of a balcony and a handrail wall in a collective facility such as a condominium, an office building, and the like. FIGS. 2A and 2B show schematic sectional views of a balcony 20 of the collective facility. A balcony space 21 serving as the predetermined space is a space corresponding to the volume in accordance with dimensions and a shape of the floor surface of the balcony 20 and the height of the handrail wall. The balcony space 21 has dimensions and a shape to occupy a rectangular parallelepiped space having one side of several tens to several hundreds of centimeters, for example. The object is, for example, a garbage bag 22 made from polyethylene or other general-purpose resin and having a volume of about 20 liters to 90 liters. The flying bodies 12 and 13 hold opposite ends of a string member 23 penetrating the garbage bag 22, and cooperate with each other to suspend the garbage bag 22 with the string member 23 to transport the garbage bag 22. The string member 23 is, for example, a rope made of chemical fibers such as nylon or polyester, a rope made of natural fibers such as cotton or linen, or a wire or a chain made of metal. The flying bodies 12 and 13 include a power device such as a motor capable of outputting lift for such flight operation, and therefore have an airframe of a certain size. The flying bodies 12 and 13 each have dimensions and a shape to occupy a rectangular parallelepiped space having a side of several tens of centimeters to one hundred and several tens of centimeters, for example. Accordingly, due to the constraint arising from the size of the balcony space 21, the flying bodies 12 and 13 may not be able to enter the balcony space 21 at the same time and perform the work for causing the string member 23 to penetrate the garbage bag 22. Thus, in the present embodiment, the server device 11 controls flight operation of the flying bodies 12 and 13 individually such that the flying bodies 12 and 13 can cooperate with each other to transport the garbage bag 22.

In the present embodiment, the server device 11 transmits an instruction to the flying bodies 12 and 13 to perform the following flight operation. The flying body 12 urges a penetrating tool toward the garbage bag 22 serving as the object, which is placed in the balcony space 21 serving as the predetermined space, and flies out of the balcony space 21 while holding a first part and a second part of the string member 23 attached to the penetrating tool. The first part has penetrated the garbage bag 22 while the second part have not penetrated the garbage bag 22. The flying body 13 waits outside the balcony space 21 and receives either the first or second part of the string member 23 from the flying body 12. As the flying bodies 12 and 13 fly while holding one or the other of the first and second parts of the string member 23, the flying bodies 12 and 13 transport the garbage bag 22 to the outside of the balcony space 21 while towing and suspending the garbage bag 22 with the string member 23. Thus, even when the flying bodies 12 and 13 cannot enter the balcony space 21 at the same time, the flying bodies 12 and 13 can cooperate with each other to transport the garbage bag 22 to the outside of the balcony space 21.

Figure 3:
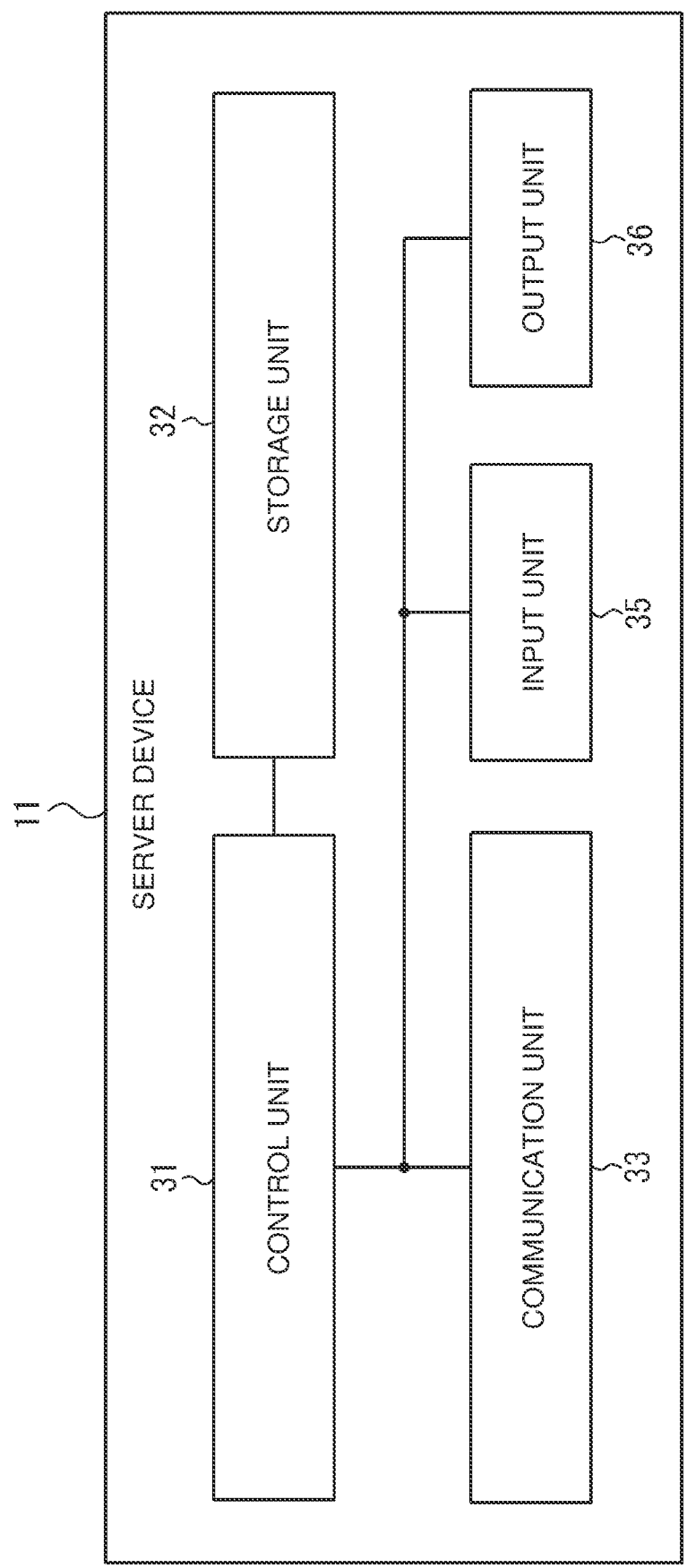
FIG. 3 is a diagram showing a configuration example of a server device.

FIG. 3 shows a configuration example of the server device 11. The server device 11 includes a control unit 31, a storage unit 32, a communication unit 33, an input unit 35, and an output unit 36. The server device 11 is, for example, a server computer belonging to a cloud computing system or other computing systems and functioning as a server implemented with various functions. The server device 11 may be one or more server computers that are connected to each other so as to be able to communicate with each other and operate in cooperation with each other.

The control unit 31 includes one or more processors, one or more dedicated circuits, or a combination thereof. The processor is a general-purpose processor such as a central processing unit (CPU) or a dedicated processor specialized for a specific process such as a graphics processing unit (GPU). The dedicated circuit is, for example, a field-programmable gate array (FPGA) or an application-specific integrated circuit (ASIC). The control unit 31 executes information processing related to the operation of the server device 11 while controlling various units of the server device 11.

The storage unit 32 includes, for example, one or more semiconductor memories, one or more magnetic memories, one or more optical memories, or a combination of at least two of them functioning as a main storage device, an auxiliary storage device, or a cache memory. The semiconductor memory is, for example, a random access memory (RAM) or a read-only memory (ROM). The RAM is, for example, a static RAM (SRAM) or a dynamic RAM (DRAM). The ROM is, for example, an electrically erasable programmable read-only memory (EEPROM). The storage unit 32 stores the information used for the operation of the server device 11 and the information obtained through the operation of the server device 11.

The communication unit 33 includes one or more communication interfaces. The communication interface is, for example, a LAN interface. The communication unit 33 receives information used for the operation of the server device 11, and transmits information obtained through the operation of the server device 11. The server device 11 is connected to the network 14 via the communication unit 33, and performs information communication with other devices via the network 14.

The input unit 35 includes one or more input interfaces. The input interface is, for example, a physical key, a capacitive key, a pointing device, a touch screen integrated with a display, or a microphone that receives voice input. The input interface may further include a camera that captures an image or an image code, or an integrated circuit (IC) card reader. The input unit 35 receives operation for inputting the information used for the operation of the server device 11, and transmits the input information to the control unit 31.

The output unit 36 includes one or more output interfaces. The output interface is, for example, a display or a speaker. The display may be, for example, a liquid crystal display (LCD), an organic electroluminescence (EL) display, or the like. The output unit 36 outputs the information obtained through the operation of the server device 11.

The function of the server device 11 is realized when a control program is executed by the processor included in the control unit 31. The control program is a program for causing a computer to execute a process of a step included in the operation of the server device 11 such that the computer can realize a function corresponding to the process of the step. That is, the control program is a program for causing the computer to function as the server device 11.

Figure 4:
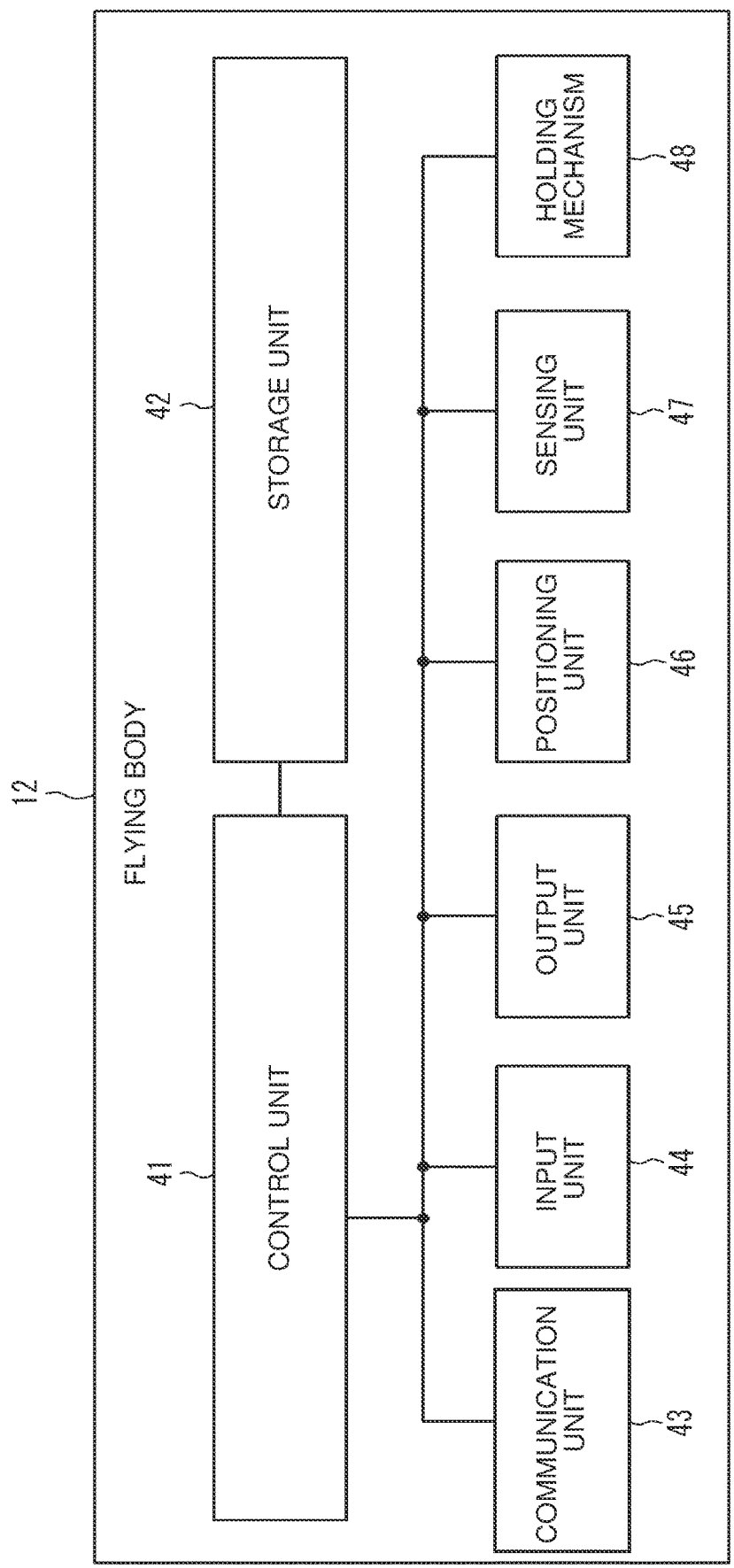
FIG. 4 is a diagram showing a configuration example of a flying body.

FIG. 4 shows a configuration example of the flying body 12. The description using the flying body 12 as an example in FIG. 4 also applies to the flying body 13 unless otherwise specified. The flying body 12 includes a control unit 41, a storage unit 42, a communication unit 43, a positioning unit 44, an input unit 45, an output unit 46, a sensing unit 47, and a holding mechanism 48.

The control unit 41 includes one or more processors, one or more dedicated circuits, or a combination thereof. The processor is a general-purpose processor such as a CPU, or a dedicated processor specialized for a specific process. The dedicated circuit is, for example, an FPGA or an ASIC. The control unit 41 executes information processing related to the operation of the flying body 12 while controlling various units of the control device 40.

The storage unit 42 includes, for example, one or more semiconductor memories, one or more magnetic memories, one or more optical memories, or a combination of at least two of them functioning as a main storage device, an auxiliary storage device, or a cache memory. The semiconductor memory is, for example, a RAM or a ROM. The RAM is, for example, a SRAM or a DRAM. The ROM is, for example, an EEPROM. The storage unit 42 executes information processing related to the operation of the flying body 12, and stores information used for the operation of the flying body 12 and information obtained through the operation of the flying body 12.

The communication unit 43 includes one or more communication interfaces. The communication interface is, for example, an interface conforming to mobile communication standards such as the long term evolution (LTE), the fourth generation (4G), or the fifth generation (5G). The communication unit 43 receives information used for the operation of the control unit 41, and transmits information obtained through the operation of the control unit 41. The control unit 41 is connected to the network 14 through the communication unit 43 via a mobile communication base station, and performs information communication with other devices via the network 14.

The positioning unit 44 includes one or more Global Navigation Satellite System (GNSS) receivers. The GNSS includes, for example, at least one of Global Positioning System (GPS), Quasi-Zenith Satellite System (QZSS), BeiDou, Global Navigation Satellite System (GLONASS), and Galileo. The positioning unit 44 acquires position information of the flying body 12.

The input unit 45 includes one or more input interfaces. The input interface is, for example, a camera that captures images, a physical key, a capacitive key, a pointing device, a touch screen integrated with a display, or a microphone that receives voice input. The input interface may further include an IC card reader. The input unit 45 receives operation for inputting the information used for the operation of the control unit 41, and transmits the input information to the control unit 41.

The output unit 46 includes one or more output interfaces. The output interface is, for example, a display or a speaker. The display is, for example, an LCD or an organic EL display. The output unit 46 outputs the information obtained through the operation of the control unit 41.

The sensing unit 47 has sensors for sensing the motion state of the flying body 12 and the surrounding situations of the flying body 12. The motion state of the flying body 12 represents a flight speed, an altitude, an inclination of a posture, and the like, and the sensors for sensing these include a speed sensor, an altitude sensor, an angular velocity sensor, and the like. The surrounding situation of the flying body 12 represents presence or absence of other objects such as obstacles, the distances from the other objects, and the like, and the sensors for sensing these include an image sensor, a distance sensor, and the like. The sensing unit 47 transmits the sensing result of the sensors to the control unit 41.

The holding mechanism 48 includes a mechanism for holding a penetrating tool for penetrating the garbage bag 22 and a control circuit therefor. The penetrating tool is a rod-shaped member having a rigidity to penetrate the garbage bag 22 and a sharp tip portion, and is, for example, a metal or plastic spear having a length of 10 centimeters to several tens of centimeters. The holding mechanism 48 holds or releases the penetrating tool in response to an instruction from the control unit 41. The holding mechanism 48 includes, for example, an electromagnet and its control circuit for attracting and holding a metal penetrating tool, or an arm pair that can be opened and closed by an actuator to hold the penetrating tool. Alternatively, the holding mechanism 48 may include a shooting mechanism capable of holding the penetrating tool by preloading the penetrating tool and urging the penetrating tool with compressed air, elasticity of an elastic member, and the like to shoot the penetrating tool in response to an instruction of the control unit 41. However, in the flying body 13, the holding mechanism 48 does not have to include a shooting mechanism for the penetrating tool. Further, the holding mechanism 48 detachably holds a terminal portion of the string member 23 having a tip portion attached to the penetrating tool. The holding mechanism 48 may, for example, attract or release the metal piece attached to the terminal portion of the string member 23 with an electromagnet, or may grip or release the terminal portion of the string member 23 with an arm pair. The holding mechanism 48 may include a reel that fixes the terminal portion of the string member 23 and winds up the string member 23.

The flight operation and other operations of the flying body 12 are realized as the power device and various mechanisms of the flying body 12 operate in response to the instruction by the control unit 41. The instruction issued by the control unit 41 is generated when the control program is executed by the processor included in the control unit 41. Part or all of the functions of the control unit 41 may be realized by a dedicated circuit included in the control unit 41.

Figure 5:
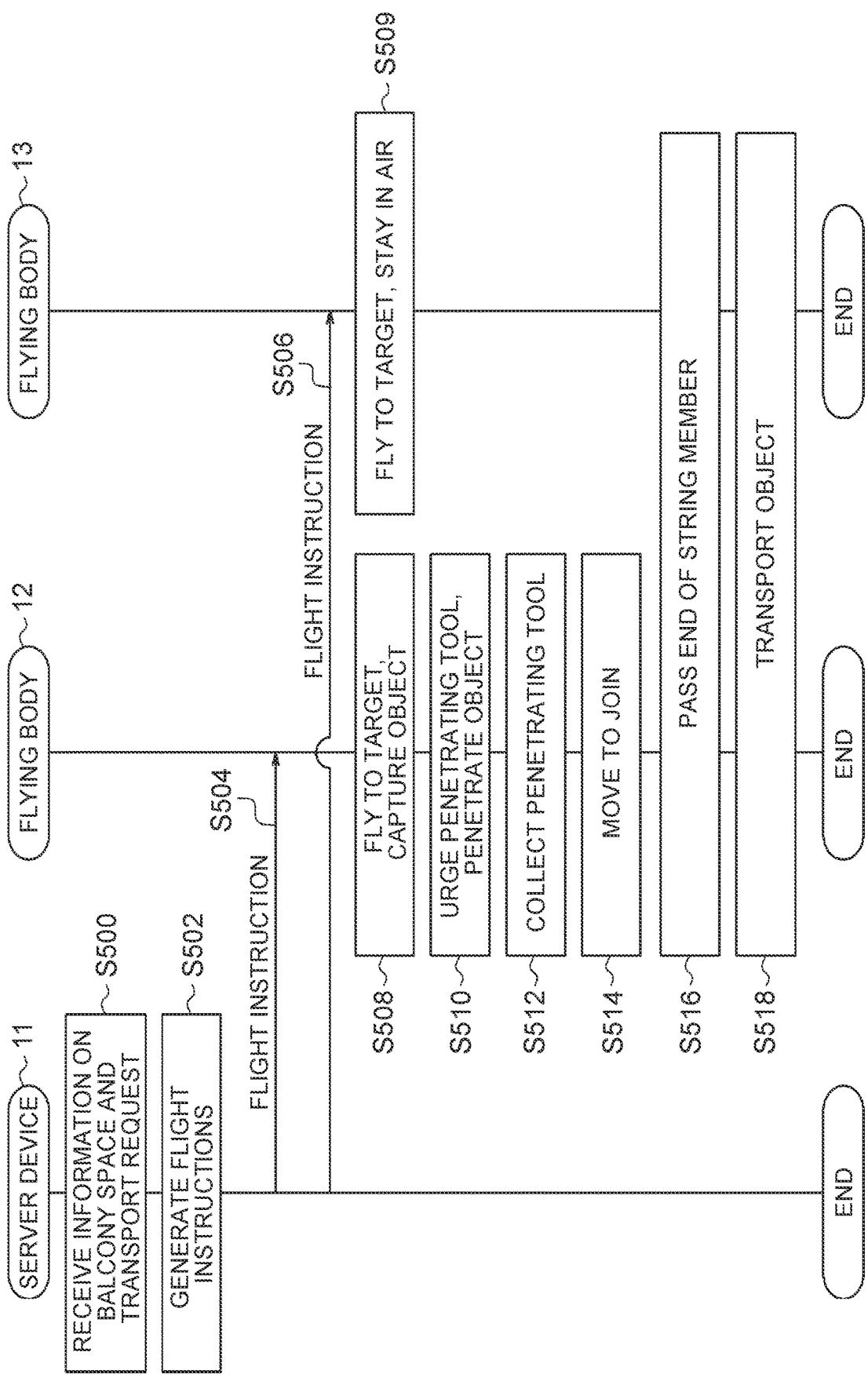
FIG. 5 is a sequence diagram showing an operation example of the transport system.

FIG. 5 is a sequence diagram showing an operation procedure of the transport system 10. FIG. 5 shows the procedure of the cooperation by the server device 11 and the flying bodies 12 and 13. Among the operations in FIG. 5, when the server device 11 transmits and receives various kinds of information to and from other devices including the flying bodies 12 and 13, the control unit 31 of the server device 11 transmits information to the other devices via the communication unit 33 and receives information from the other devices. When the flying bodies 12 and 13 transmit and receive information to and from other devices including the server device 11, the control unit 41 of each of the flying bodies 12 and 13 receives information from the other devices via the communication unit 43 and receives information from the other devices. When the server device 11 executes various kinds of information processing, the control unit 31 executes the process using information stored in the storage unit 32. When the flying bodies 12 and 13 perform flight or other operations, the control unit 41 of each of the flying bodies 12 and 13 generates and outputs instructions for various operations. The power device and various mechanisms operate in response to the instructions, so that the various operations of the flying bodies 12 and 13 are realized.

The procedure of FIG. 5 is executed, for example, when a resident or the like of a collective facility requests collection of the garbage bag 22. For example, a resident or the like places the garbage bag 22 at a predetermined position in the balcony space 21 and transmits to the server device 11 a transport request of the garbage bag 22 together with information on the balcony space 21 where the garbage bag 22 is placed using a general-purpose communication terminal such as a smartphone or a dedicated communication terminal installed in the collective facility or the like. The information on the balcony space 21 is information for specifying the balcony space 21, information for specifying a dwelling unit or the like in a collective facility, position information of the balcony space 21, and the like. Then, in step S500, the server device 11 receives the information on the balcony space 21 and the transport request.

In step S502, the server device 11 generates flight instructions for the flying bodies 12 and 13 based on the information on the balcony space 21. In the storage unit 32 of the server device 11, information on a shape, dimensions, and spatial coordinates of the balcony space 21 for each balcony provided in the collective facility, information on the position where the garbage bag 22 is placed, and information on the parking place for the flying bodies 12 and 13 are stored in advance. The parking place for the flying bodies 12 and 13 is provided, for example, on the roof of the collective facility or at any location within the premises. The control unit 31 determines a target in each flight of the flying bodies 12 and 13 and a flight path from the parking place to the target by a given algorithm, and generates the flight instructions including the targets, the flight paths, and various operations during the flight.

In steps S504 and S506, the server device 11 transmits the flight instructions to the flying bodies 12 and 13. The flying bodies 12 and 13 each receive the flight instruction.

The flying bodies 12 and 13 respectively perform the operations in step S508 and onward based on the flight instructions. Here, an example is shown in which the flying bodies 12 and 13 perform their respective operations based on the flight instructions received once from the server device 11 in steps S504 and S506. However, the server device 11 may transmit the flight instructions to the flying bodies 12 and 13 at appropriately divided timings. For example, the server device 11 may receive information indicating the execution status of the operation at that time from each of the flying bodies 12 and 13 at any timing, generate flight instructions for the next operation, and transmit the generated flight instructions to the flying bodies 12 and 13, so that the flying bodies 12 and 13 perform operations according to the flight instructions at any timing.

The operations of the flying body 12 in steps S508 to S514 will be described with reference to FIGS. 2A and 2B.

In step S508, the flying body 12 flies to the target and captures the object. The target is, for example, spatial coordinates within the balcony space 21. When the flying body 12 enters the balcony space 21 and reaches the target, the control unit 41 captures the garbage bag 22 with the sensing unit 47. The control unit 41 captures the garbage bag 22 by deriving the presence of the garbage bag 22 and the distance to the garbage bag 22 based on the sensing result from the sensing unit 47. For example, when the image sensor of the sensing unit 47 captures an image of the surroundings of the flying body 12 and transmits the captured image to the control unit 41, the control unit 41 performs image processing including pattern recognition on the captured image to detect the image of the garbage bag 22. Further, when the distance sensor of the sensing unit 47 measures the distance to the garbage bag 22 and transmits the measurement result to the control unit 41, the control unit 41 derives the distance to the garbage bag 22 based on the measurement result. The flying body 12 holds the penetrating tool 60 and the other end of the string member 23 having one end attached to the penetrating tool 60, with the holding mechanism 48.

In step S510, the flying body 12 urges the penetrating tool 60 toward the garbage bag 22 that is the object, and causes the penetrating tool 60 to penetrate the object.

For example, the flying body 12 urges the penetrating tool 60 by moving with a certain propulsive force or more while holding the penetrating tool 60 with the holding mechanism 48. At this time, the flying body 12 moves in such a direction and at such an angle that the tip of the penetrating tool 60 pierces the garbage bag 22. At this time, the control unit 41 determines, based on the captured image and the distance information, for example, the direction and the angle of movement such that the penetrating tool 60 pierces a position near the seal opening of the garbage bag 22 where there is a high probability that the contents are not present, such as a position within a given distance from the seal opening that is recognized by image recognition. The propulsive force by the flying body 12 is set as appropriate in advance, in consideration of the rigidity of the material of the garbage bag 22 and the rigidity of the penetrating tool 60. Thus, the tip of the penetrating tool 60 pierces the garbage bag 22 and penetrates the garbage bag 22.

Further, the flying body 12 shoots the penetrating tool 60 with the shooting mechanism provided in the holding mechanism 48 to urge the penetrating tool 60. At this time, the flying body 12 shoots the penetrating tool 60 toward the garbage bag 22 while staying in the air at such a position that the tip of the shot penetrating tool 60 pierces the garbage bag 22. The position where the flying body 12 stays in the air is set as appropriate in advance, in consideration of the rigidity of the material of the garbage bag 22, the rigidity of the penetrating tool 60, and the magnitude of the force applied to the penetrating tool 60 by the shooting mechanism. At this time, the control unit 41 determines, based on the captured image and the distance information, for example, the position where the flying body 12 stays in the air such that the penetrating tool 60 pierces the position near the seal opening of the garbage bag 22 where there is a high probability that the contents are not present. Thus, the tip of the penetrating tool 60 pierces the garbage bag 22 and penetrates the garbage bag 22.

In step S512, the flying body 12 collects the penetrating tool 60 that has penetrated the garbage bag 22 that is the object. For example, the flying body 12 causes the holding mechanism 48 to release the penetrating tool 60, and moves to a position where the tip of the penetrating tool 60 can be held by the holding mechanism 48 again. Alternatively, the flying body 12 releases the penetrating tool 60 by causing the holding mechanism 48 to shoot the penetrating tool 60, and then moves to a position where the tip of the penetrating tool 60 can be held by the holding mechanism 48 again. Then, the flying body 12 holds the end of the penetrating tool 60 that has penetrated the garbage bag 22, that is, the tip of the penetrating tool 60, with the holding mechanism 48. Thereafter, the flying body 12 moves to a position for pulling out the penetrating tool 60 from the garbage bag 22, and collects the penetrating tool 60. The position where the flying body 12 moves to hold the penetrating tool 60 again and the position where the flying body 12 moves to hold the penetrating tool 60 and causes the penetrating tool 60 to penetrate the garbage bag 22 are derived by the control unit 41, for example, based on information on the length of the penetrating tool 60 provided in advance, the shape and the position of the garbage bag 22 recognized by image recognition, and the like.

Steps S510 to S512 are executed with the flying body 12 holding the terminal portion of the string member 23. Therefore, when step S512 is executed and the penetrating tool 60 is collected, the flying body 12 reaches a state of holding the penetrating tool 60 that has penetrated the garbage bag 22 and the terminal portion of the string member 23. That is, the flying body 12 reaches a state of holding a part of the string member 23 on the tip portion side that has penetrated the garbage bag 22 and a part of the string member 23 on the terminal portion side that has not penetrated the garbage bag 22.

On the other hand, the flying body 13 flies to the target in response to the flight instruction in step S509 of FIG. 5. The target is, for example, a given position near the balcony space 21. Due to the constraint arising from the size of the balcony space 21, the flying body 13 does not enter the balcony space 21 while the flying body 12 is located in the balcony space 21. When the flying body 13 reaches the target near the balcony space 21, the flying body 13 stays in the air and waits.

The operations of the flying bodies 12 and 13 in steps 5514 to 5518 will be described.

In step S514, the flying body 12 moves to a position where the flying body 13 stays in the air to join the flying body 13. At this time, the flying body 12 flies without moving the position of the garbage bag 22 while holding the part of the string member 23 on the tip portion side that has penetrated the garbage bag 22 and the part of the string member 23 on the terminal portion side. Therefore, the position where the flying body 13 stays in the air is a position where the flying body 12 can reach within the range of the length of the string member 62. The flying body 12 acquires the position where the flying body 13 is waiting based on the information transmitted from the server device 11 in advance or at any time. When the flying body 12 flies to the position where the flying body 13 stays in the air outside the balcony space 21 to approach the flying body 13 within a predetermined distance determined as appropriate, the flying bodies 12 and 13 join.

In step S516, the flying body 12 passes one end of the string member 23 to the flying body 13. Then, the flying body 12 passes the penetrating tool 60 to the flying body 13. The flying body 12 releases the penetrating tool 60 with the holding mechanism 48. The flying body 13 receives the penetrating tool 60 by holding the penetrating tool 60 with the holding mechanism 48. Thus, the part of the string member 23 on the tip portion side that has penetrated the garbage bag 22 is passed from the flying body 12 to the flying body 13. Alternatively, the flying body 12 may pass the terminal portion of the string member 23 to the flying body 13. In that case, the flying body 12 releases the terminal portion of the string member 23 with the holding mechanism 48. The flying body 13 receives the terminal portion of the string member 23 by holding the terminal portion of the string member 23 with the holding mechanism 48. Thus, the part of the string member 23 on the terminal portion side that has not penetrated the garbage bag 22 is passed from the flying body 12 to the flying body 13.

In step S518, the flying bodies 12 and 13 transport the garbage bag 22 that is the object from the balcony space 21 that is the predetermined space. As shown in FIG. 2B, the flying bodies 12 and 13 move while one of the flying bodies 12 and 13 is holding the part of the string member 23 on the tip portion side that has penetrated the garbage bag 22 and the other is holding the part of the string member 23 on the terminal portion side that has not penetrated the garbage bag 22, so that the flying bodies 12 and 13 transport the garbage bag 22 to the outside of the balcony space 21 while towing and suspending the garbage bag 22 with the string member 23. Thus, the flying bodies 12 and 13 transport the garbage bag 22 to a predetermined collection place, for example.

Through the operations of the flying bodies 12 and 13 performed under the control of the server device 11 as described above, the flying bodies 12 and 13 can cooperate with each other to transport the garbage bag even when there is a constraint arising from the size of the balcony space 21.

Figure 6:
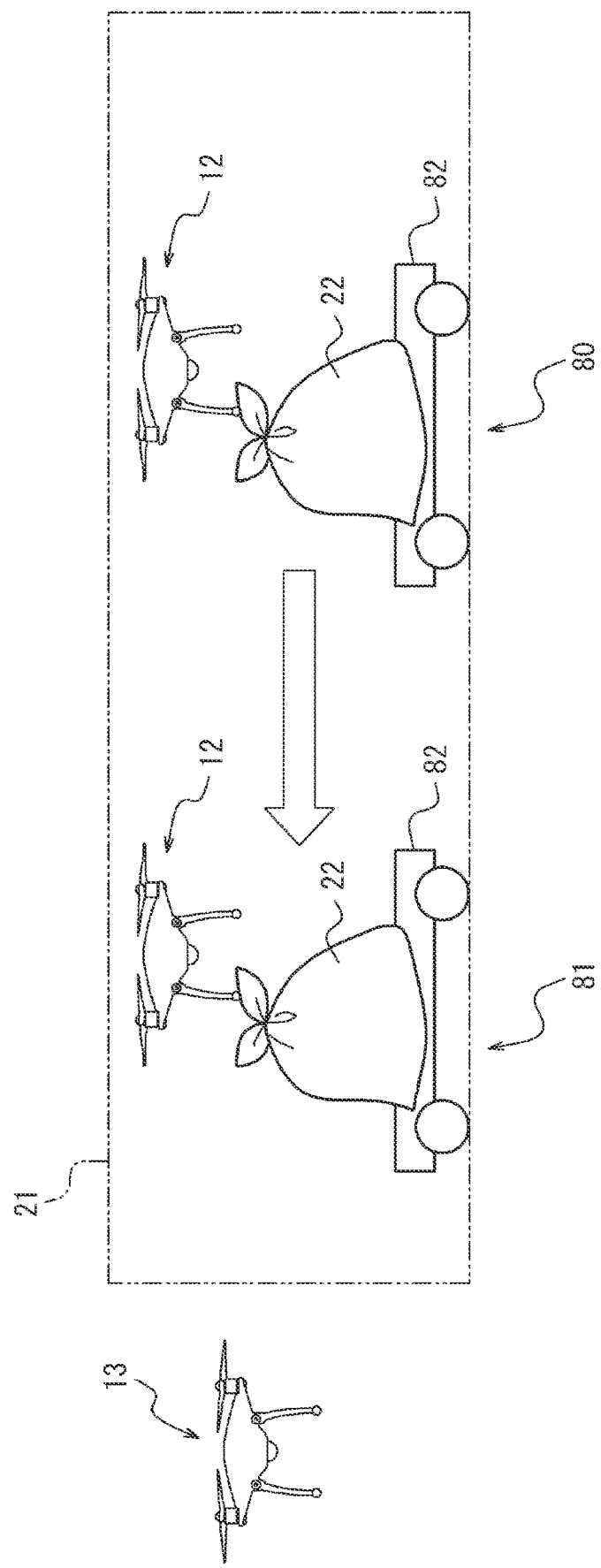
FIG. 6 is a diagram illustrating operation of the flying body in a modification.

FIG. 6 is a diagram illustrating an operation of the flying body 12 in a modification. The operation in FIG. 6 is performed between step S508 and step S510 in FIG. 5.

Depending on the shape of the balcony space 21, there may be a certain distance between a position 80 where the garbage bag 22 is first placed and a position 81 on a side where it is easy to secure a space for the flying body 13 to stay in the air. In such a case, even when the flying body 12 causes the string member 23 to penetrate the garbage bag 22 at the position 80, the flying body 12 may not be able to move to the position where the flying body 12 can join the flying body 13 due to the constraint arising from the length of the string member 23. Alternatively, there is a case in which the balcony space 21 has such a shape and dimensions that a sufficient space for the flying body 12 to perform the flight operation for causing the penetrating tool 60 to penetrate the garbage bag 22 cannot be secured at the position 80 but can be secured at the position 81. Therefore, in the modification, the flying body 12 further includes a gripping mechanism for gripping the garbage bag 22. The gripping mechanism includes, for example, an arm pair that is capable of gripping the garbage bag 22 and that is opened and closed by an actuator that operates in response to an instruction from the control unit 41, and a control circuit therefor. The flying body 12 grips the garbage bag 22 and tows the garbage bag 22 from the position 80 to the position 81 to move the garbage bag 22. By doing so, the operations in step S510 and onward become possible, and the garbage bag 22 can be transported by the flying bodies 12 and 13.

In a more preferred mode, a mounting table 82 including a moving mechanism is provided on the floor surface of the balcony 20 corresponding to the balcony space 21. The mounting table 82 is configured to be slidable on the floor surface by wheels, for example. Thus, the flying body 12 can move the garbage bag 22 from the position 80 to the position 81 with a smaller propulsive force.

Figure 7:
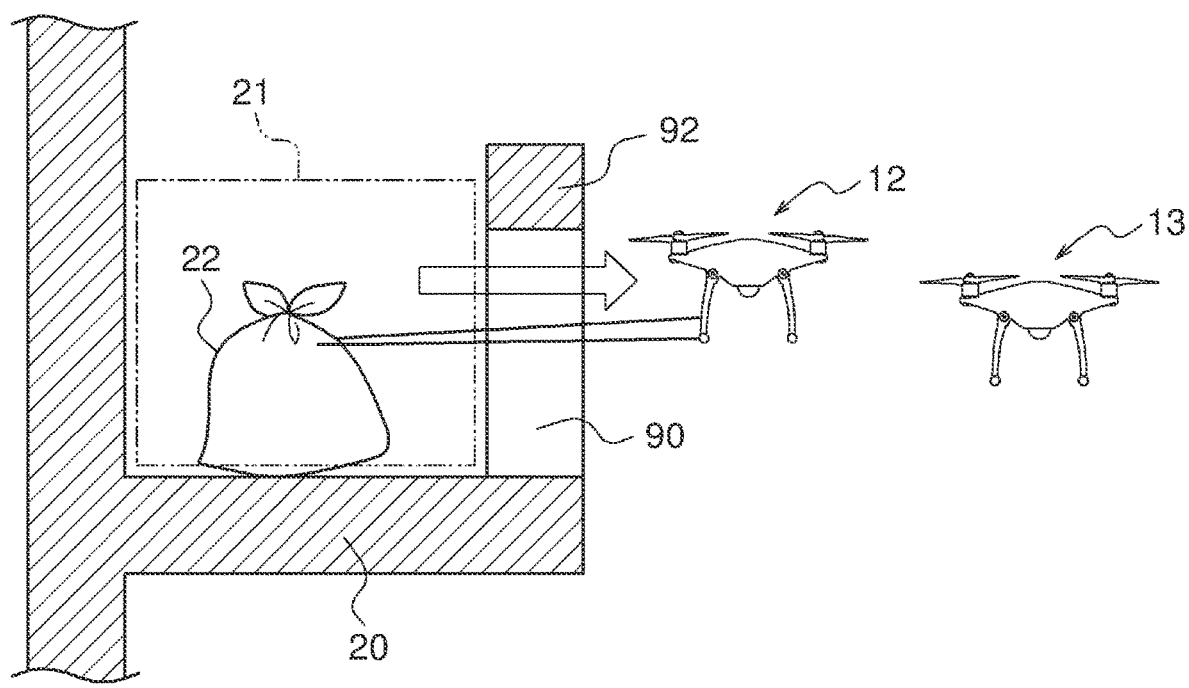
FIG. 7 is a diagram illustrating operation of the flying body in a modification.

FIG. 7 is a diagram illustrating another modification. FIG. 7 shows a schematic sectional view of the balcony 20 of the collective facility. The handrail wall 92 of the balcony 20 is provided with an opening 90 having such a shape and dimensions that the flying body 12 and the garbage bag 22 can pass through the opening 90. The opening 90 is provided with, for example, a door that can be opened and closed, and is configured to sense the approach of the flying body 12 to open the door. When the flying body 12 moves from the balcony space 21 and joins the flying body 13 waiting outside the balcony space 21 (step S514 in FIG. 5), the flying body 12 passes through the opening 90. Further, when the flying bodies 12 and 13 transport the garbage bag 22 by towing with the string member 23 (step S518 in FIG. 5), the garbage bag 22 is transported from the balcony space 21 through the opening 90. When the garbage bag 22 is transported by towing from above the handrail wall, the garbage bag 22 may interfere with the handrail wall 92, or friction may hinder the transport of the garbage bag 22 or damage the garbage bag 22. However, by transporting the garbage bag 22 through the opening 90, it is possible to suppress such a situation.

EXAMPLES

In the above embodiment, towing of the garbage bag 22 with the string member 23 is started with both the flying bodies 12 and 13 located outside the handrail of the balcony 20, and then the garbage bag 22 is carried out of the balcony space 21 and further transported to the outside of the handrail of the balcony 20. The following example relates to a case in which towing of the garbage bag 22 is started with one of the flying bodies 12 and 13 (for example, the flying body 12) located inside the handrail of the balcony 20 and the other (for example, the flying body 13) located outside the handrail of the balcony 20.

Figure 8A:
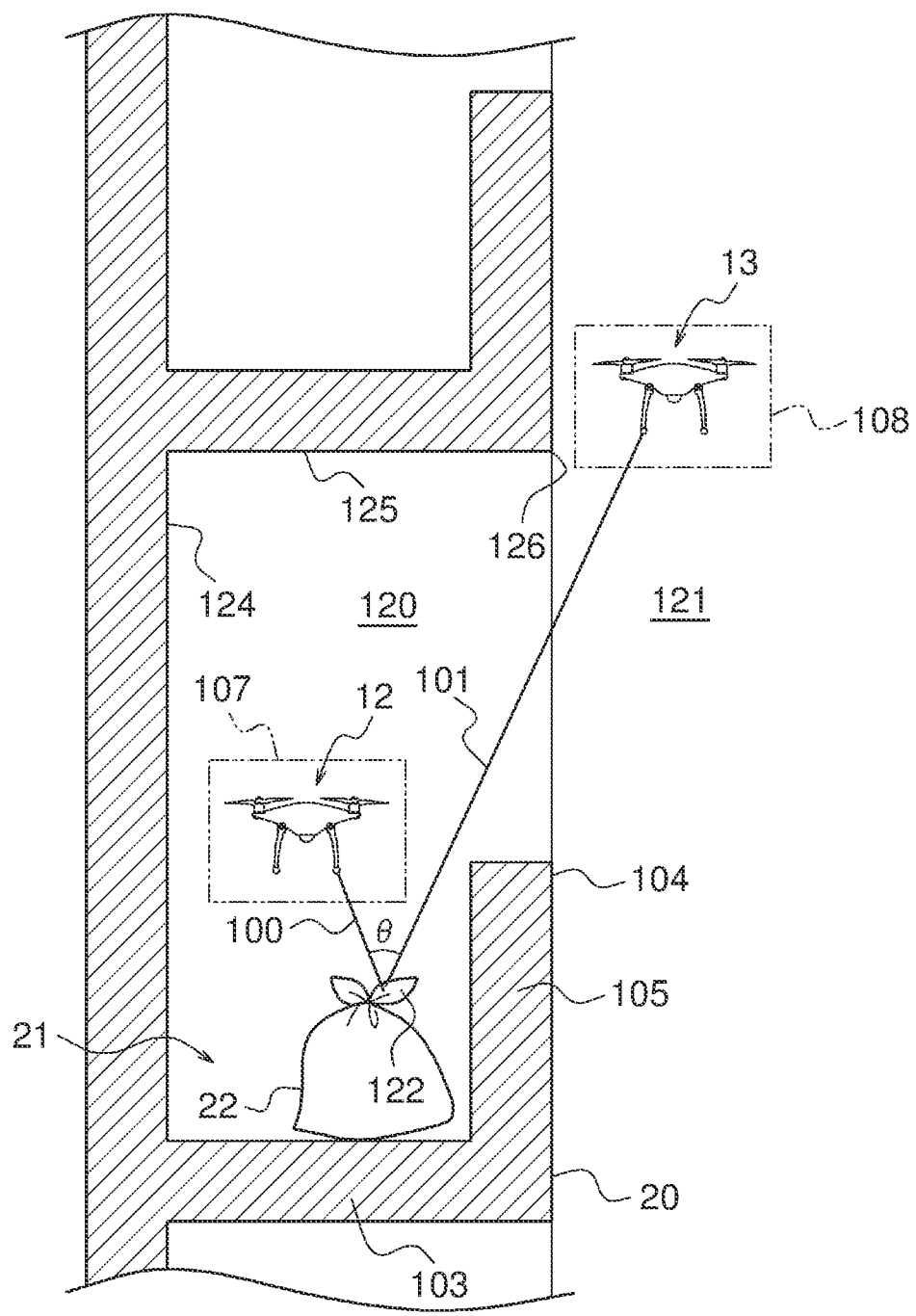
FIG. 8A is a diagram illustrating the operation of the flying body.
Figure 8B:
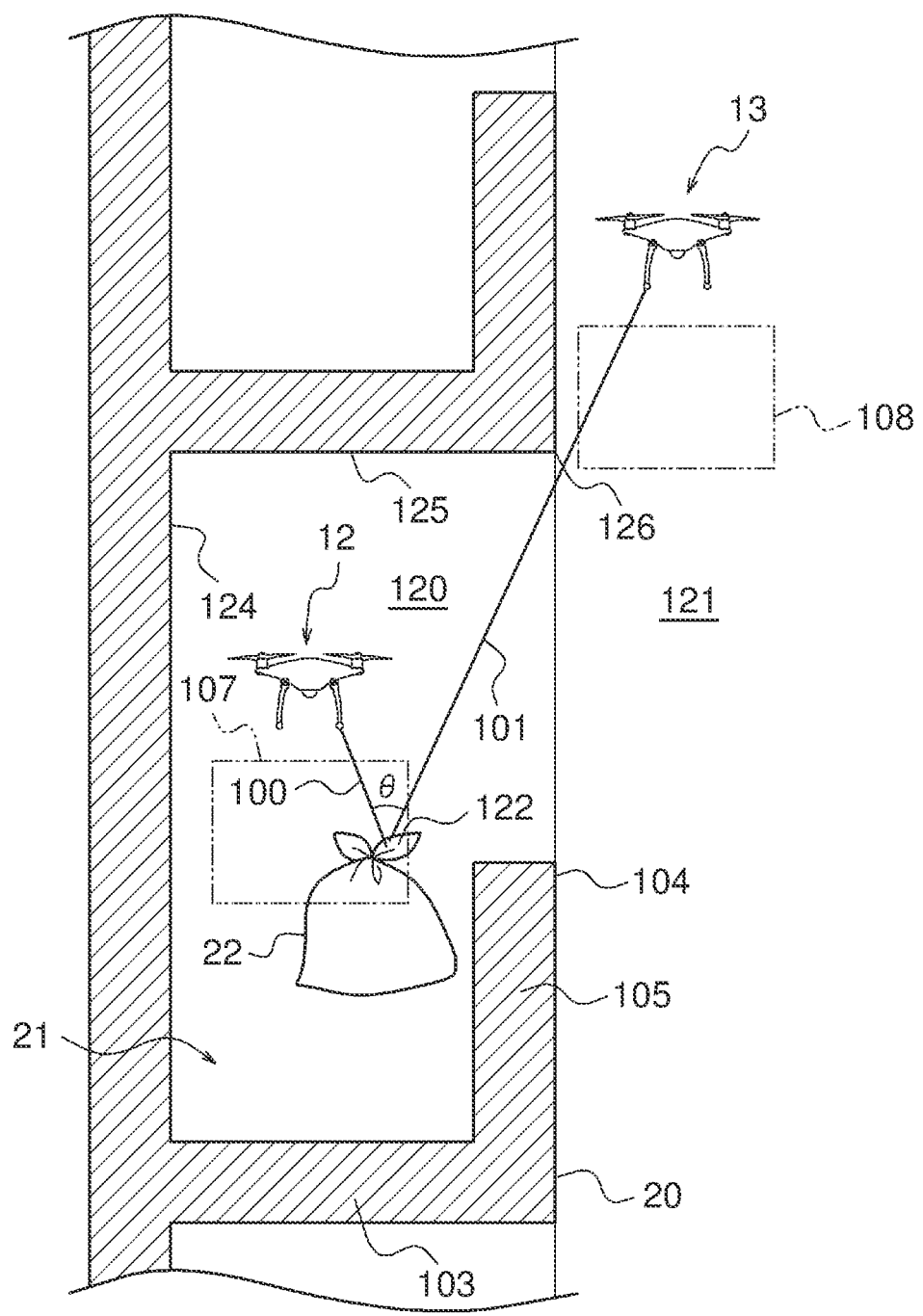
FIG. 8B is a diagram illustrating the operation of the flying body.
Figure 8C:
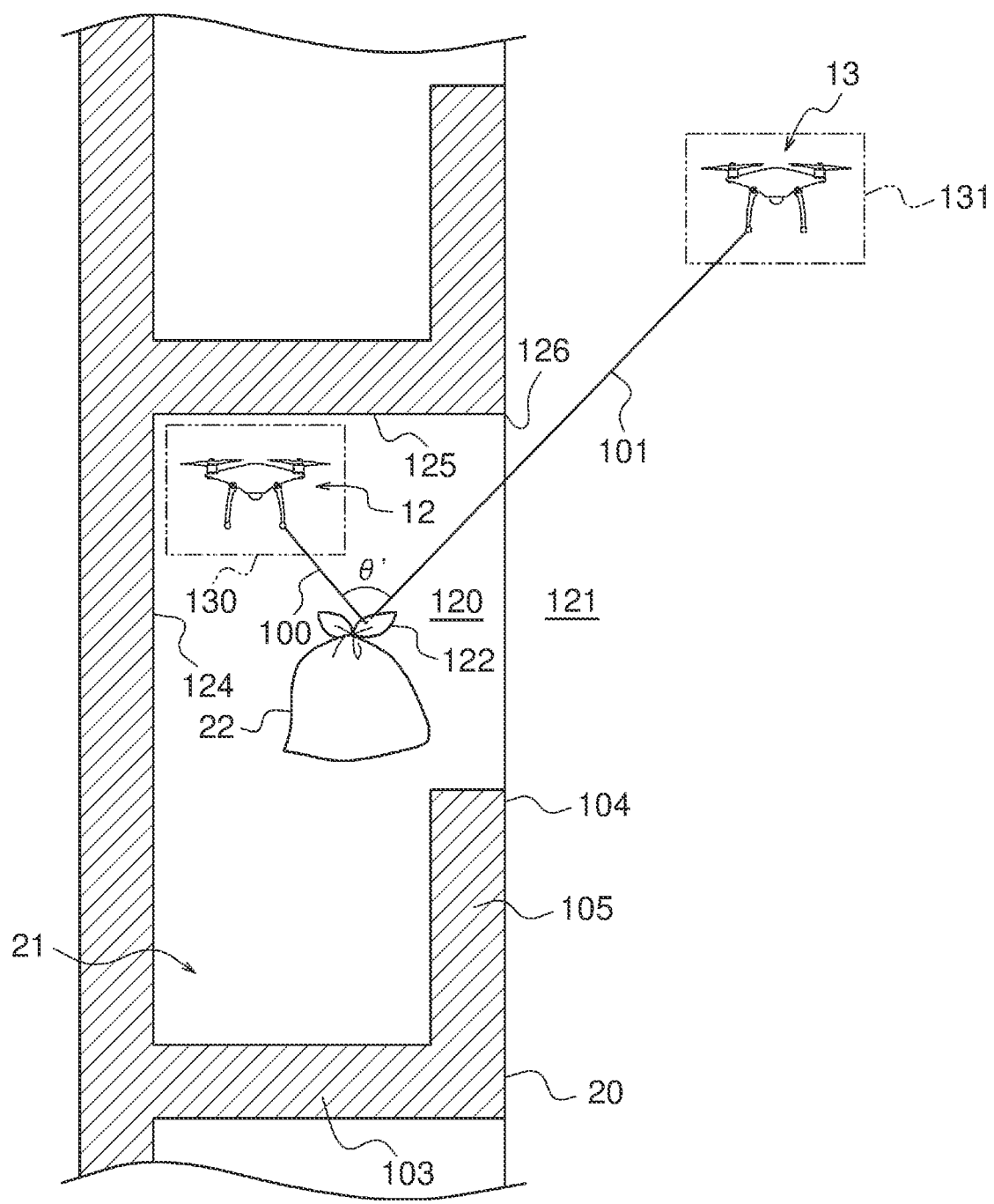
FIG. 8C is a diagram illustrating the operation of the flying body.

FIGS. 8A to 8C are diagrams showing an example of the operation of the flying bodies 12 and 13 transporting the garbage bag 22 in the example.

FIG. 8A shows a state in which the flying bodies 12 and 13 are holding respective parts of string members 100 and 101 closer to the free ends. Ends of the string members 100 and 101 are attached to the garbage bag 22. At this time, only the flying body 12 is located at an ascending start position 107 of the inside 120 of the handrail 104 of the balcony 20. The flying body 13 is located at an ascending start position 108 of the outside 121 of the handrail 104. This state is realized as the string member 23 is caused to penetrate the garbage bag 22 by the operation shown in FIG. 5 and the flying bodies 12 and 13 hold the parts at the opposite ends of the string member 23 and move to the ascending start positions 107 and 108. In that case, a part of the string member 23 closer to the flying body 12 corresponds to the string member 100, and a part of the string member 23 closer to the flying body 13 corresponds to the string member 101. Alternatively, the string members 100 and 101 may be attached to the garbage bag 22 through operations different from the operations shown in FIGS. 5 and 6. For example, a resident or the like of a collective facility causes a string member to penetrate the garbage bag 22 that the resident desires to be collected or fixes each end of a pair of string portions to the garbage bag 22 in advance, and transmits a transport request to the server device 11. The flying bodies 12 and 13 may alternately enter the inside 120 of the handrail 104 of the balcony 20 and hold the respective parts of the string members 100 and 101 closer to the free ends with the holding mechanisms 48, so that the state of FIG. 8A is realized.

In this example, the flying bodies 12 and 13 that have received the flight instructions from the server device 11 perform the following flight operations. The flying body 12 holding, at the inside 120 of the handrail 104, the first string member 100 attached to the garbage bag 22 that is the object located on the floor surface 103 of the balcony 20 and the flying body 13 holding, at the outside 121 of the handrail 104, the second string member 101 attached to the garbage bag 22 ascend from the ascending start positions 107 and 108, respectively, to suspend and lift the garbage bag 22 with the string members 100 and 101 such that an angle between the string members 100 and 101 is a predetermined angle θ. At this time, the angle θ between the string members 100 and 101 at an attachment position 122 where the string members 100 and 101 are attached to the garbage bag 22 is an angle that the string member 101 does not interfere with the handrail 104. Thus, the garbage bags 22 suspended by the flying bodies 12 and 13 with the string members 100 and 101 are transported to the outside 121 of the handrail 104.

If the angle between the string members 100 and 101 is too wide when the flying bodies 12 and 13 suspend the garbage bag 22, the string member 101 may interfere with the handrail 104 to damage the string member 101 or the flying body 13 may be overloaded. However, by setting the angle θ such that the string member 101 does not interfere with the handrail 104, it is possible to transport the garbage bag 22 from the inside 120 of the handrail 104 to the outside 121 while reducing such a possibility.

Next, specific operations of the flying bodies 12 and 13 in this example will be described.

First, the flying bodies 12 and 13 hold the string members 100 and 101, respectively, in step S516 of FIG. 5, and then move to the ascending start positions 107 and 108, respectively, so that the state of FIG. 8A is established.

Alternatively, when the string members 100 and 101 are attached to the garbage bag 22, the procedure shown in FIG. 9A is executed. FIG. 9A relates to operations of the flying bodies 12 and 13 from holding the string members 100 and 101, respectively, to moving to the ascending start positions 107 and 108, respectively, to reach the state of FIG. 8A. Hereinafter, the procedure of FIG. 9A will be described with reference to FIGS. 8A to 8D.

The procedure of FIG. 9A is executed, for example, when a resident or the like of a collective facility requests collection of the garbage bag 22. For example, a resident or the like places the garbage bag 22 at a predetermined position on the floor surface 103 of the balcony 20, and attaches the string members 100 and 101 to the garbage bag 22. Any attachment method can be used. For example, a tool for attaching to the garbage bag 22 is provided, in advance, to the ends of the string members 100 and 101, and a resident or the like attaches the string members 100 and 101 to the garbage bag 22 using this tool. Examples of such a tool include a hook for hooking a bent portion of the garbage bag 22 or penetrating the garbage bag 22 for hooking, a tool including an adhesive portion or a bonding portion that can be attached to the garbage bag 22, a net that can accommodate and hold the garbage bag 22, a belt that ties and holds the garbage bag 22, and the like. Alternatively, a resident or the like may attach the string members 100 and 101 to the garbage bag 22 by tying the vicinity of the sealing portion of the garbage bag 22 at the ends of the string members 100 and 101. The resident or the like transmits to the server device 11 a transport request of the garbage bag 22 together with the information on the balcony space 21 where the garbage bag 22 is placed using a general-purpose communication terminal such as a smartphone or a dedicated communication terminal installed in the collective facility or the like. Then, in step S1100, the server device 11 receives the information on the balcony space 21 and the transport request.

In step S1102, the server device 11 generates flight instructions for the flying bodies 12 and 13 based on the information on the balcony space 21. The control unit 31 determines a target in each flight of the flying bodies 12 and 13 and the flight path from the parking place to the target by a given algorithm, and generates the flight instructions including the targets, the flight paths, and various operations during the flight.

In steps S1104 and S1106, the server device 11 transmits the flight instructions to the flying bodies 12 and 13. The flying bodies 12 and 13 each receive the flight instruction.

The flying bodies 12 and 13 respectively perform the operations in steps S1108 and S1109 and onward based on the flight instructions. Here, an example is shown in which the flying bodies 12 and 13 perform their respective operations based on the flight instructions received once from the server device 11 in steps S1104 and S1106. However, the server device 11 may transmit the flight instructions to the flying bodies 12 and 13 at appropriately divided timings. For example, the server device 11 may receive information indicating the execution status of the operation and the surrounding situation from each of the flying bodies 12 and 13 at any timings, generate flight instructions for the next operation, and transmit the generated flight instructions to the flying bodies 12 and 13, so that the flying bodies 12 and 13 perform operation according to the flight instructions at any timings.

In step S1108, the flying body 12 flies to the target and captures the string member. The target is, for example, spatial coordinates at the inside 120 of the handrail 104 of the balcony 20. When the flying body 12 reaches the target, the control unit 41 captures the string member 100 with the sensing unit 47. The control unit 41 captures the string member 100 by deriving the presence of the string member 100 and the distance to the string member 100 based on the sensing result from the sensing unit 47. For example, the control unit 41 performs image processing including pattern recognition on the image captured by the image sensor of the sensing unit 47, and detects the image of the string member 100. The string member 100 is identified by, for example, attaching a color, a mark, and the like to a part near the free end. Further, the control unit 41 derives the distance to the string member 100 based on the measurement result from the distance sensor of the sensing unit 47.

In step S1110, the flying body 12 holds the string member. For example, the flying body 12 moves to a position where the part of the string member 100 to be held that is near the free end can be held by the holding mechanism 48. Then, the flying body 12 holds the string member 100 with the holding mechanism 48. For example, the part of the string member 100 to be held is specified by a color, a mark, and the like, and the control unit 41 identifies the part to be held by image processing, and causes the holding mechanism 48 to operate to hold the string member 100. Alternatively, a metal member may be attached in advance to the part of the string member 100 to be held, and may be attracted by the electromagnet of the holding mechanism 48.

In step S1112, the flying body 12 withdraws to an appropriate position at the outside 121 of the handrail 104 and stays at that position.

In step S1114, the flying body 13 moves to the inside 120 of the handrail 104 and captures the string member. The control unit 41 of the flying body 13 operates in the same manner as the operation of the control unit 41 of the flying body 12 in step S1108.

In step S1116, the flying body 13 holds the string member. For example, the flying body 13 moves to a position where the part of the string member 101 near the free end can be held by the holding mechanism 48. The control unit 41 of the flying body 13 operates in the same manner as the operation of the control unit 41 of the flying body 12 in step S1110, and causes the holding mechanism 48 to hold the string member 101. The part of the string member 101 to be held is configured to be identified by a color, a mark, addition of a metal member, and the like.

In step S1118, the flying body 13 moves to the ascending start position. The ascending start position 108 of the flying body 13 is spatial coordinates at the outside 121 of the handrail 104 that can be reached within the length of the string member 101. The ascending start position 108 is derived by the control unit 31 of the server device 11 and is transmitted to the flying body 13 while being included in the flight instruction in step S1106.

In step S1120, the flying body 12 moves to the ascending start position. The ascending start position 107 of the flying body 12 is spatial coordinates at the inside 120 of the handrail 104 that can be reached within the length of the string member 100. The ascending start position 107 is derived by the control unit 31 of the server device 11 and is transmitted to the flying body 12 while being included in the flight instruction in step S1104.

In the above procedure, due to the constraint arising from the size of the balcony space 21 at the inside 120 of the handrail 104 of the balcony 20, the flying bodies 12 and 13 cannot capture and hold the string members 100 and 101, respectively, at the same time. Therefore, the flying body 12 first captures and holds the string member 100 and moves to the ascending start position 107. However, a procedure may be adopted in which the flying body 13 first captures and holds the string member 101 and moves to the ascending start position 108, and then the flying body 12 captures and holds the string member 100 and moves to the ascending start position 107.

In FIG. 8A, the ascending start positions 107 and 108 of the flying bodies 12 and 13 satisfy the following conditions. That is, when the control unit 41 of the server device 11 generates the flight instructions for the flying bodies 12 and 13, the control unit 41 obtains the spatial coordinates of the ascending start positions 107 and 108 that satisfy various conditions by an appropriate algorithm, using information on the dimensions and the shape of the balcony 20, the dimensions and the shape of the floor surface 103, the dimensions, the shape, and the position of the handrail 104, the dimensions, the shape, and the position of a bottom surface of the balcony on the upper floor, the position, expected size and weight of the garbage bag 22, the dimensions, the shapes, and the propulsive forces of the flying bodies 12 and 13, and the like. The information used at this time is stored in the storage unit 32 in advance. First, the ascending start position 107 of the flying body 12 is a position at the inside 120 of the handrail 104, above the attachment position 122 where the string members 100 and 101 are attached to the garbage bag 22 and at a distance that is reachable within the range of the length of the string member 100. Further, the ascending start position 108 of the flying body 13 is a position at the outside 121 of the handrail 104, above the attachment position 122 and at a distance that is reachable within the range of the length of the string member 101. Then, the ascending start positions 107 and 108 are determined such that the angle θ between the string members 100 and 101 at the attachment position 122 satisfies the following conditions. That is, the angle θ is such an angle that the flying body 12 does not interfere with an outer wall 124 of the building and the upper structure, namely, the bottom surface 125 of the balcony on the upper floor, when the flying body 12 is located at the ascending start position 107 and the string member 101 does not interfere with the handrail 104 when the flying body 13 is located at the ascending start position 108. Further, the angle θ is such an angle that when the flying bodies 12 and 13 generate propulsive forces on the extension lines of the string members 100 and 101, respectively, the combined force of the propulsive forces act upward in the vertical direction so that the garbage bag 22 can be suspended and lifted. When the performances of the flying bodies 12 and 13 are equivalent and the propulsive forces generated thereby are equivalent, the angle θ is determined such that the combined force of the propulsive forces of the two flying bodies exceeds the propulsive force of one flying body. Such an angle θ is the sum of the angles when the angles formed by the string members 100 and 101 with respect to the vertical upward direction are each less than 60 degrees, and therefore less than 120 degrees.

The lengths of the string members 100 and 101 and the positions of the respective parts of the string members 100 and 101 held by the flying bodies 12 and 13 are determined in advance such that the corresponding ascending start positions 107 and 108 satisfy the above conditions. At least the length of the string member 101 and the position of the part of the string member 101 held by the flying body 13 are determined such that the ascending start position 108 of the flying body 13 is located at the outside 121 of the handrail 104. Similarly, when the flying body 12 causes the string member 23 to penetrate the garbage bag 22 and the part closer to the flying body 12 is set as the string member 100 and the part closer to the flying body 13 is set as the string member 101, the lengths of the string members 100 and 101 and the positions of their respective parts held by the flying bodies 12 and 13 are determined in advance.

When the state of FIG. 8A is established as described above, the flying bodies 12 and 13 then start moving to transport the garbage bag 22.

FIG. 9B shows an operation procedure when the flying bodies 12 and 13 move from the ascending start positions 107 and 108, respectively, and transport the garbage bag 22.

In steps S1121 and S1122, the flying bodies 12 and 13 ascend from the ascending start positions 107 and 108 to the ascending end positions, respectively. As shown in FIG. 8B, the flying bodies 12 and 13 generate lift and thrust such that the propulsive forces act in the directions of the extension lines of the string members 100 and 101, and ascend. Thereby, the flying bodies 12 and 13 tow and lift the garbage bag 22 vertically upward using the combined force of the propulsive forces. However, if the flying bodies 12 and 13 continue to ascend in this state, the flying body 12 may interfere with the bottom surface 125 of the balcony on the upper floor, or the string member 101 may interfere with a bottom surface outer edge 126 of the balcony on the upper floor. Steps S1121 and S1122 are executed in order to suppress such a risk.

In steps S1121 and S1122, the flying bodies 12 and 13 move such that the angle θ becomes an angle θ'. As shown in FIG. 8C, the flying bodies 12 and 13 move to the ascending end positions 130 and 131 such that the angle between the string members 100 and 101 at the attachment position 122 becomes the angle θ' that is larger than the angle θ. The ascending end positions 130 and 131 satisfy the following conditions. That is, when the control unit 41 of the server device 11 generates flight instructions for the flying bodies 12 and 13, the control unit 41 obtains the spatial coordinates of the ascending end positions 130 and 131 that satisfy various conditions by an appropriate algorithm, using information on the dimensions and the shape of the balcony 20, the dimensions, the shape, and the position of a bottom surface of the balcony on the upper floor, the position, expected size and weight of the garbage bag 22, the dimensions, the shapes, and the propulsive forces of the flying bodies 12 and 13, and the like. First, the ascending end position 130 of the flying body 12 is such a position at the inside 120 of the handrail 104 that the flying body 12 does not interfere with the outer wall 124 of the building and the bottom surface 125 of the balcony on the upper floor. Further, the ascending end position 131 is such a position that the string member 101 held by the flying body 13 does not interfere with the bottom surface outer edge 126 of the balcony on the upper floor. Here, the angle θ' is maintained within such an angle that when the flying bodies 12 and 13 generate propulsive forces on the extension lines of the string members 100 and 101, respectively, the combined force of the propulsive forces act upward in the vertical direction so that the garbage bag 22 can be suspended and lifted. When the performances of the flying bodies 12 and 13 are equivalent and the propulsive forces generated are equivalent, the angle θ' is maintained to be less than 120 degrees.

Figure 8D:
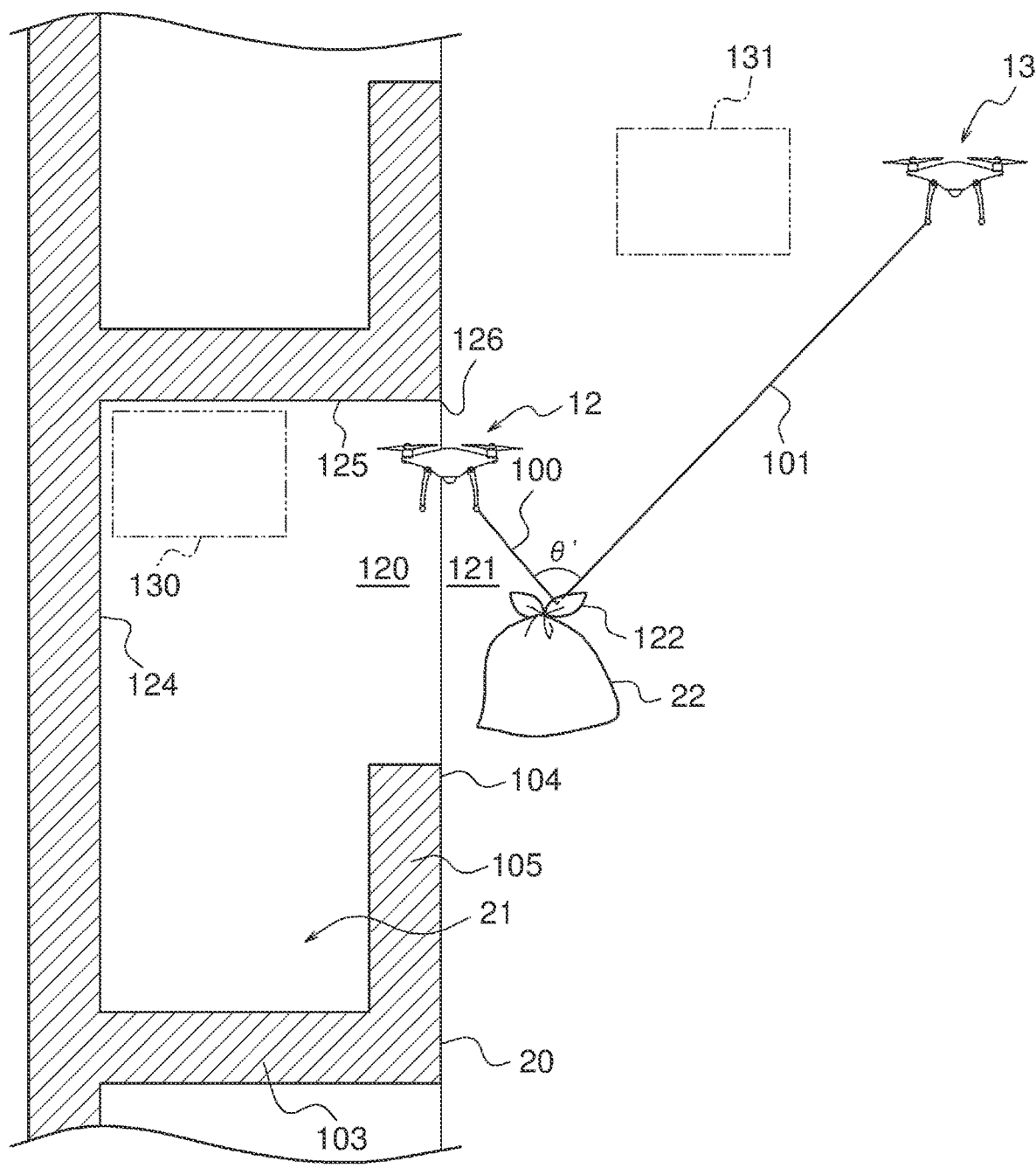
FIG. 8D is a diagram illustrating the operation of the flying body.

In steps S1123 and S1124, the flying bodies 12 and 13 start to move in the horizontal direction from the ascending end positions 130 and 131, and transport the garbage bag 22 to the outside 121 of the handrail. As shown in FIG. 8D, the flying bodies 12 and 13 generate thrust such that a propulsive force for moving horizontally to the outside 121 of the handrail 104 acts while maintaining lift at the ascending end positions 130 and 131. By doing so, the flying bodies 12 and 13 transport the garbage bag 22 across the handrail 104 while suspending the garbage bag 22 with the angle θ' being maintained. Then, the flying bodies 12 and 13 continue the flight in accordance with the flight instructions.

According to the above embodiment, even when one of the flying bodies 12 and 13 is located at the inside 120 of the handrail 104 of the balcony 20 and the other is located at the outside 121 under the spatial constraint of the inside 120 of the handrail 104 of the balcony 20, it is possible to transport the garbage bag 22. Therefore, it is possible to improve the efficiency of the flight operations by the flying bodies 12 and 13.

In the above embodiment, the processing and control program that defines the operations of the flying bodies 12 and 13 is stored in the server device 11, and may be downloaded to the flying bodies 12 and 13 via the network 14 to be stored in the storage unit 42, or may be stored in a recording or storage medium and read by the flying bodies 12 and 13 to be stored in the storage unit 42.

The present disclosure is not limited to the embodiment described above. For example, blocks shown in the block diagram may be integrated, or a block may be divided. Instead of executing the steps shown in the flowcharts in chronological order according to the description, the steps may be executed in parallel or in a different order, depending on the processing capacities of the devices that execute the steps, or as necessary. Other changes may be made without departing from the scope of the present disclosure.

What is claimed is:

1. A server device comprising:
a communication unit; and
a control unit that transmits an instruction for causing a plurality of flying bodies to perform flight operation to the flying bodies via the communication unit, wherein:
the flight operation includes
a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members, and
a second step in which the first and second flying bodies move horizontally so as to transport the object suspended with the first and second string members to the outside of the handrail; and
the predetermined angle is such an angle that the second string member does not interfere with the handrail during the first step.

2. The server device according to claim 1, wherein the predetermined angle is such an angle that the first flying body does not interfere with a building including the balcony during the first step.

3. The server device according to claim 1, wherein the predetermined angle is such an angle that the first flying body does not interfere with a structure above the balcony during the first step.

4. The server device according to claim 1, wherein the predetermined angle is such an angle that the second string member does not interfere with a structure above the balcony during the first step.

5. The server device according to claim 1, wherein a length of the first string member is such a length that the first flying body does not interfere with a building including the balcony.

6. The server device according to claim 1, wherein a length of the first string member is such a length that the first flying body does not interfere with a structure above the balcony during the first step.

7. The server device according to claim 1, wherein a propulsive force of the first flying body is the same as a propulsive force of the second flying body, and the predetermined angle is less than 120 degrees.

8. A system comprising:
a plurality of flying bodies; and
a server device that transmits an instruction for causing the flying bodies to perform flight operation to the flying bodies, wherein:
the flight operation includes
a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members, and
a second step in which the first and second flying bodies move horizontally so as to transport the object suspended with the first and second string members to the outside of the handrail; and
the predetermined angle is such an angle that the second string member does not interfere with the handrail during the first step.

9. The system according to claim 8, wherein the predetermined angle is such an angle that the first flying body does not interfere with a building including the balcony during the first step.

10. The system according to claim 8, wherein the predetermined angle is such an angle that the first flying body does not interfere with a structure above the balcony during the first step.

11. The system according to claim 8, wherein the predetermined angle is such an angle that the second string member does not interfere with a structure above the balcony during the first step.

12. The system according to claim 8, wherein a length of the first string member is such a length that the first flying body does not interfere with a building including the balcony.

13. The system according to claim 8, wherein a length of the first string member is such a length that the first flying body does not interfere with a structure above the balcony during the first step.

14. An operation method for a system including a plurality of flying bodies and a server device that transmits an instruction for causing the flying bodies to perform flight operation to the flying bodies, the operation method comprising:
a first step in which a first flying body holding a first string member attached to an object located on a floor surface of a balcony at an inside of a handrail of the balcony and a second flying body holding a second string member attached to the object at an outside of the handrail ascend such that an angle between the first and second string members is a predetermined angle, to suspend and lift the object with the first and second string members; and
a second step in which the first and second flying bodies move horizontally so as to transport the object suspended with the first and second string members to the outside of the handrail,
wherein the predetermined angle is such an angle that the second string member does not interfere with the handrail during the first step.

15. The operation method according to claim 14, wherein the predetermined angle is such an angle that the first flying body does not interfere with a building including the balcony during the first step.

16. The operation method according to claim 14, wherein the predetermined angle is such an angle that the first flying body does not interfere with a structure above the balcony during the first step.

17. The operation method according to claim 14, wherein the predetermined angle is such an angle that the second string member does not interfere with a structure above the balcony during the first step.

18. The operation method according to claim 14, wherein a length of the first string member is such a length that the first flying body does not interfere with a building including the balcony.

19. The operation method according to claim 14, wherein a length of the first string member is such a length that the first flying body does not interfere with a structure above the balcony during the first step.

20. The operation method according to claim 14, wherein a propulsive force of the first flying body is the same as a propulsive force of the second flying body, and the predetermined angle is less than 120 degrees.

* * * * *